(12) United States Patent
Mayer et al.

(10) Patent No.: US 12,034,256 B2
(45) Date of Patent: Jul. 9, 2024

(54) SYSTEMS, DEVICES, AND METHODS FOR CONNECTORS

(71) Applicant: Infineon Technologies AG, Neubiberg (DE)

(72) Inventors: Albrecht Mayer, Deisenhofen (DE); Patrik Eder, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 467 days.

(21) Appl. No.: 17/329,559

(22) Filed: May 25, 2021

(65) Prior Publication Data

US 2021/0367366 A1 Nov. 25, 2021

(30) Foreign Application Priority Data

May 25, 2020 (DE) ...................... 10 2020 113 924.1

(51) Int. Cl.
*H01R 13/66* (2006.01)
*G06F 13/40* (2006.01)
*G06F 13/42* (2006.01)

(52) U.S. Cl.
CPC ....... *H01R 13/665* (2013.01); *G06F 13/4081* (2013.01)

(58) Field of Classification Search
CPC .................. H01R 13/665; G06F 13/4282; G06F 13/4081
USPC ......................................................... 710/302
See application file for complete search history.

(56) References Cited

U.S. PATENT DOCUMENTS

| | | | | |
|---|---|---|---|---|
| 6,813,132 B1* | 11/2004 | Mitlmeier | ............ | H01H 47/002 |
| | | | | 361/160 |
| 9,705,243 B1* | 7/2017 | McCracken | ........... | H01R 24/60 |
| 2009/0091330 A1* | 4/2009 | Ruth | ...................... | H03K 17/18 |
| | | | | 324/537 |
| 2017/0062974 A1* | 3/2017 | Daoura | ............. | H01R 13/6205 |
| 2018/0181410 A1* | 6/2018 | Itkin | ................... | G06F 13/4282 |
| 2019/0132681 A1 | 5/2019 | Rand | | |

* cited by examiner

*Primary Examiner* — Chun Kuan Lee
(74) *Attorney, Agent, or Firm* — Eschweiler & Potashnik, LLC (57) ABSTRACT

A circuitry is disclosed having one or more circuits and a connector portion coupled that is to the one or more circuits. The connector portion includes a plurality of pins, at least some of the pins having assigned functionality, and wherein at least one first pin is to activate a mechanism to bring the one or more circuits into an electrically safe state. The circuitry is configured, in case the connector portion is coupled with a first connector in a first orientation, to allow the one or more circuits to operate properly via the connector portion. The circuitry is also configured so that in a case where the connector portion is coupled with a second connector in a second orientation different from the first orientation, the at least one first pin of the plurality of pins receives a reference potential that triggers activation of a safety mechanism.

20 Claims, 6 Drawing Sheets

SYSTEMS, DEVICES, AND METHODS FOR CONNECTORS

REFERENCE TO RELATED APPLICATION

This application claims priority to German Application No. 10 2020 113 924.1, filed on May 25, 2020, the contents of which are hereby incorporated by reference in their entirety.

TECHNICAL FIELD

Various embodiments relate generally to connector systems.

BACKGROUND

For connecting tools like a debugger to a target board, a standard connector is often needed. Ideally, this connector fulfills following requirements: small size and footprint, adequate signal pins, suitable for high-speed signals, low cost, mechanically robust, long term availability, operationally robust (e.g., ESD measures, mechanical, incorrect plug orientation, incorrect HW combination, etc.).

A USB C-type connector may be used but problems may arise because support for such a connector may allow the plugging in of any kind of USB device (e.g., USB B) which may not be compatible, and whose connections, if improperly plugged in, can damage the chips on the target board or on the USB device side. Standard USB C-type pinning has mostly differential signals with a low voltage level, whilst for debugging, mostly signals with regular input/output (IO) voltage (e.g., 3.3V or 5V) are needed. If a low impedance 3.3V source (e.g., a driving pin of the target device) is connected to a differential pin on the USB device side, damage on one or both sides may occur.

Further, a USB Type-C plug has a mechanically symmetrical build, that is, it is without mechanical polarization. For a tool connector, it is more advantageous to conduct more signals than to being able to connect it with both orientations. Therefore, it should be ensured that if the tool (or a USB device) is plugged in with the wrong orientation, damage is avoided and that the tool can easily detect and adapt to this situation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the described embodiments. In the following description, various embodiments are described with reference to the following drawings, in which.

DESCRIPTION

The following detailed description refers to the accompanying drawings that show, by way of illustration, specific details and embodiments.

The word "exemplary" is used herein to mean "serving as an example, instance, or illustration." Any embodiment or design described herein as "exemplary" is not necessarily to be construed as preferred or advantageous over other embodiments or designs.

Figure 1:
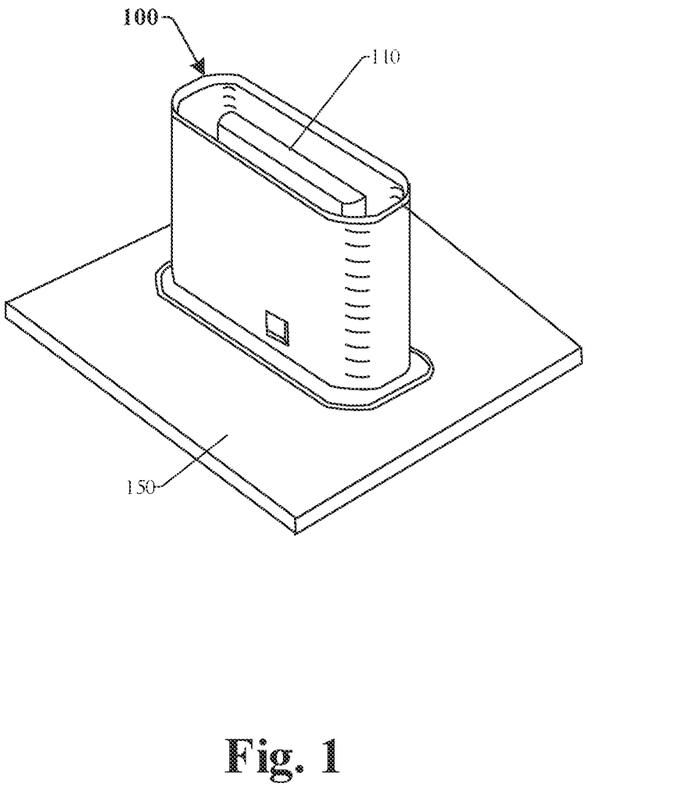
FIG. 1 shows a connector and a circuit board.

FIG. 1 shows a connector port 100. The connector port or portion 100 can be configured to receive a connector plug, such as, for example a USB type, e.g., USB C-type connector. The connector port 100 may be integrated into or coupled to a board so as to provide an electrical or electronic interface between one or more circuits of a circuit board 150 and one or more outside or peripheral devices. As shown, the connector port 100 includes a plurality of pins 110.

In accordance with exemplary embodiments of the present disclosure, the connector port 100 may be configured to mechanically or physically accept or receive certain standardized types of connectors or connector plugs, such as USB type connectors, in one example. However, the connector port 100 may be further modified for safety reasons and for allowing more or most of the pins from a connector connecting to the connector port 100 to be used in comparison to other known standard connectors.

Figure 2:
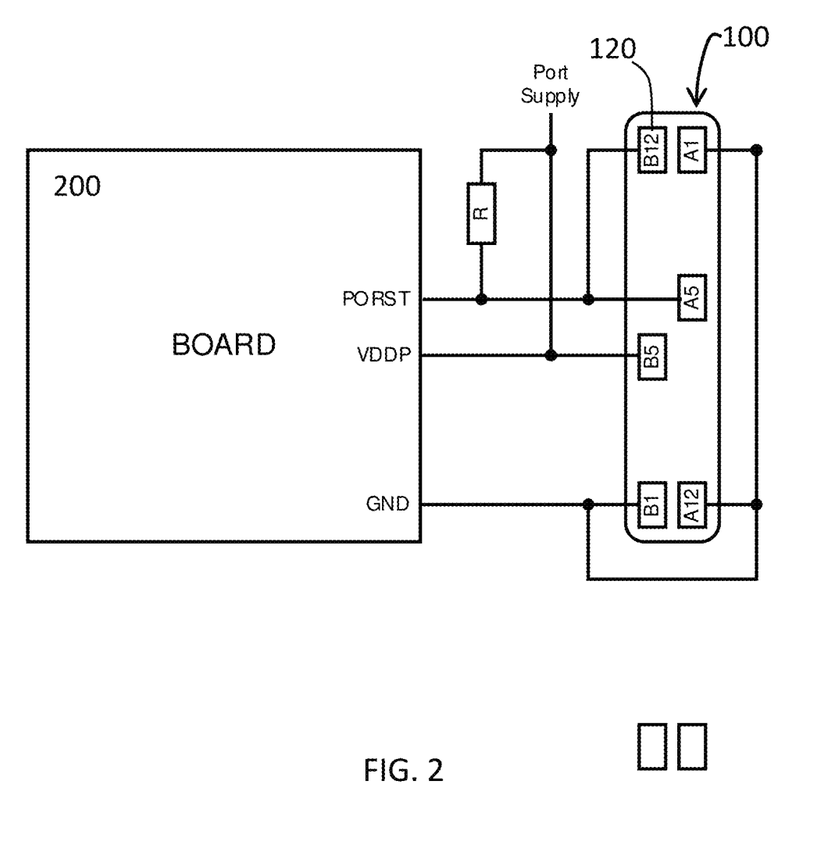
FIG. 2 shows a diagram of an example circuit board and an example connector portion according one or more exemplary embodiments of the present disclosure.

FIG. 2 shows an exemplary diagram of a connector port 100 interface coupled to the circuit board 200 in accordance with one or more exemplary embodiments of the present disclosure. The connector port 100 connected to the board 200 may be configured to ensure protection in the event that a connector plug of an outside or peripheral device is incorrectly or wrongly connected to the connector port and/or in the event that the outside device is incompatible and becomes connected to the connector port 100. In other words, if an incorrect or wrongly connected plug is inserted or coupled to the connector port 100, the connector port 100 and the board are configured to or designed to prevent damage from occurring in the board to which the connector port or the connecting plug is connected and/or an associated device to which the connector plug is connected.

The connector port 100 may be mechanically compatible with known standard connector plugs, such as a USB C-type connector plug. In at least one example, the connector port 100 may have 24 pins mechanically compatible and corresponding to USB C-type standard connector ports. That is, the pins (E.G., 110 of FIG. 1) may physically correspond to a standard, (e.g., USB C-type standard), and in other cases, the connector 100 may have a differing number of pins according to other standards. In FIG. 2, not all the pins for the connector port 100 are displayed for simplicity reasons.

According to various connector standards, one or more pins of a connector port may be assigned to certain functions or signals. For example, according to the USB C-type standard, the pins A1, A12, B1, and B12 of the connector are assigned to ground connections.

In exemplary embodiments of the present disclosure, one or more of the pins may be configured to trigger or cause at least one or more circuits of the board and/or the connector itself to be brought into a known, safe state, e.g., an electrically safe state. This may be accomplished by coupling at least one pin of the connector to a mechanism. In FIG. 2 pin 120 of the connector port 100 is coupled to a reset, e.g., (power-on reset) of the board. The pin 120, may correspond to a pin assigned to ground (GND) pin, such as pin the B12 of the USB C-type standard pinout as shown in FIG. 2. As such, the plurality of pins 110 have been modified from a standard specification. Specifically, as shown in FIG. 2, instead of being coupled to a ground connection, the pin 120 (B12) is coupled to a reset of the board 200. However, other pins that correspond to GND pins, may remain the same, that is, may be coupled to ground, and as such, the pins corresponding to A1, A12, B1 of the connector 100 are coupled to ground of the board 200.

In various embodiments, the reset of the board 200 may be configured as active low reset, such as a powered-on reset (PORST).

If a connector is connected or plugged into the connector port 100 so that a ground pin of a connector plug connects or contacts the pin 120, the result will be to connect the potential of the pin to ground (GND) and thus providing an active low input to the reset.

In exemplary embodiments, connectors such as the connector 100 may be modified so that a pin (e.g., pin 120) is forced to low reference potential (e.g., ground potential) if an incompatible device (e.g., a device not intended or configured to be used with the board 200 or connector port 100) is plugged in, or when a connector plug is incorrectly plugged into the port 100. A plug may be incorrectly plugged or connected to the connector port 100 if the plug is inserted or connected with an incorrect or wrong orientation with respect to the connector port 100. A device configured to operate with the board 200 may only operate correctly or normally if the connector plug of the device has a certain orientation when connected to the connector port 100.

While USB C-type connectors and connector ports are designed to be rotationally symmetric, the connector ports described herein may be configured to only operate (or operate properly) for a particular orientation of the connecting plug. For example, while the connector port 100 may be able to accept a connecting plug of a device from more than one orientation (e.g., two orientations 180 degrees from each other), but only one orientation may allow the device to operate properly.

As noted, the connection of an incorrectly oriented plug to the device or an incompatible device can force the pin 120 of the connector 100 to a low-state, e.g., to a reference potential such as ground. Accordingly, this pin 120 (e.g., corresponding to pin B12) when forced low (e.g., to a low potential such as ground) triggers the reset of the board 200. In the exemplary embodiment of FIG. 2, the reset may be a powered-on reset (PORST) which can be coupled to an internal pull-up resistor and further coupled to an external pull-up resistor R. The reset (e.g., PORST) may be normally high, i.e., having a high state in a normal or non-reset/inactive mode, which is triggered in response to a low-input (e.g., when ground potential coupled to the pin). In response to being triggered, the PORST may send at least one signal so as to cause the one or more circuits of the board, which have an electrical signal on the connector 100, to go into a safe state.

The board 200 may include one or more circuits or devices (not shown), including, for example, a microcontroller operably coupled to the connector port or portion 100. Further, the one or more circuits or devices of the circuit board 200 may include a mechanism, e.g., a safety mechanism. According to at least one exemplary embodiment of the disclosure, this mechanism may be triggered or activated by a low input to the reset (e.g., PORST). The safety mechanism may be configured to, after being triggered or activated, cause or bring the board 200 or components thereof, into a safety state, e.g., an electrically safe state. The mechanism protects the components of the board from damage, e.g., from electrically based or other damage that could occur by the connection of an incorrectly connected device or by an incompatible device. For example, the electrically safe state protects against shorts, overheating, and other electrically damaging events. The mechanism may operate by bringing the circuits to a high impedance pin state.

The safe state can be implemented to ensure that the voltage and current for both connected circuits stay within a range, which will not damage the circuits. This may be a particular factor when both sides of the connector are driving different voltage levels because this can result in a damaging high current. A simple safe state can be realized if the pin of the connector portion is in an input mode. If both pins, of the connector and connector portion, have the same supply voltage, then there is no problem and a safe state is realized.

If the other side of the connector is an output pin or any other low impedance pin (e.g. a supply voltage, GND), then this voltage may be within the allowed range for an input pin of the connector portion, and thus can be safe. If a differential signal is connected to this input pin of the connector portion, then the cases differential input and differential applied from an output pin are similar. That is, a low voltage can be seen by the input pin, which is safe. A typical reset behavior, can bring the relevant pins into input mode and provide the needed safety mechanism.

Figure 3:
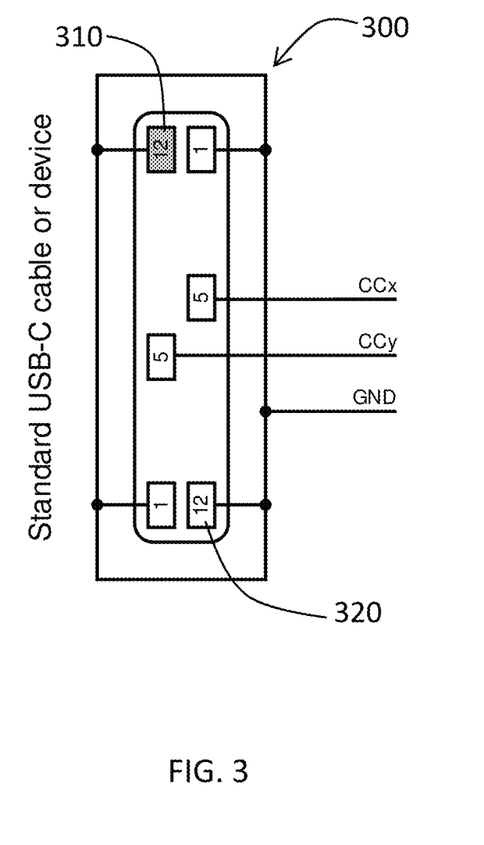
FIG. 3 shows a diagram of an example connector.

FIG. 3 shows a diagram of a connector 300 that may be connected to a device (not shown). The connector 300 may be a USB C-type connector. The connector 300 may be physically compatible (i.e., capable of being physically connected to the connector port 100) but the device having such connector may not be operable or compatible with the connector port 100 and/or the board 200. When the connector 300 is connected to the connector port 100, the pin 310 connect or contacts the pin 120 of connector port 100. Therefore, since the pin 310 is coupled to a low potential (e.g., ground potential) this triggers a reset, such as a PORST, on the board and causing the circuits of the board 200, connected to the connector 300, to enter into a known safe state. Accordingly, no electrical or related damage will be caused to the board 200, the connector port 100, the connector 300, and/or any device connected to the connector 300.

The same result would also occur if the connector 300 were rotated 180 degrees and plugged in. In such a case, the white connector pin 320, which is also connected to ground, would provide a low-input to the PORST and thus activate the safety mechanism so as to cause at least the circuits of the board 200 into the safe state.

Figure 4A:
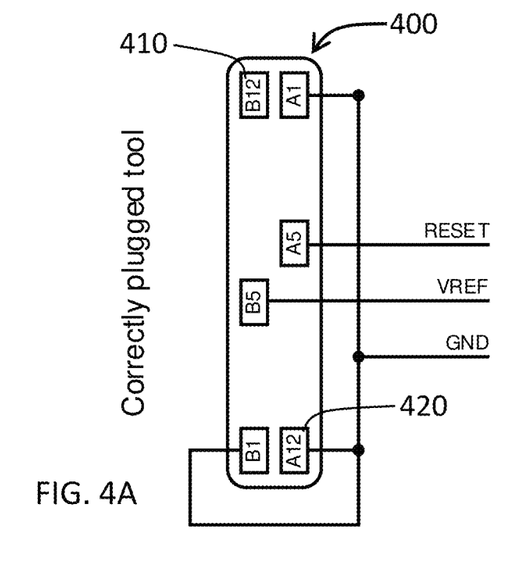
FIGS. 4A and 4B show a diagram of example connectors in accordance with one or more exemplary embodiments of the present disclosure.
Figure 4B:
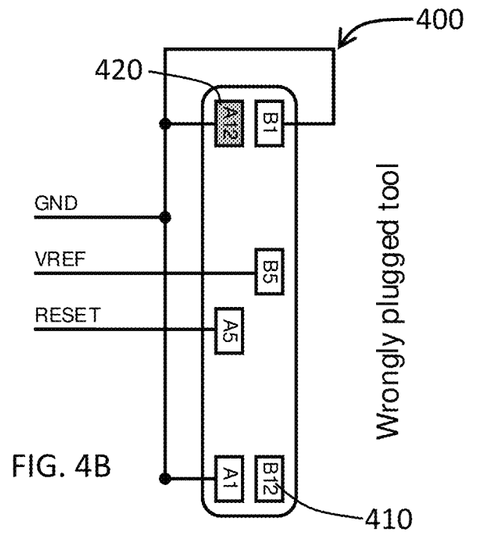

FIGS. 4A and 4B shows a connector 400 that may be connected to a connector port 200 and board 100 of the present disclosure. FIG. 4A shows a diagram representing the connector 400 connected to the connector port 100 in a first orientation. FIG. 4B shows a diagram representing the connector 400 connected to the connector port 100 in a second orientation which is 180 degrees rotated from the orientation of FIG. 4A.

In the cases of FIGS. 4A and 4B, the connector 400 may be coupled to a device that is compatible with the connector 100 and board 200. However, the device may only operate and interface properly if the connector 400 is connected to the connector port 100 in the correct orientation.

The diagram of FIG. 4A may represent the connector 400 being oriented and correctly connected to the connector 100 and the board 200. This connection may be considered a first orientation.

In the case of FIG. 4A, the connector pin 410 contacts or connects to the pin 120 of the connector. In the case of connector 400, the connector pin 410 may not be coupled to ground or low-potential. Instead, the connector may not be connected to anything or electrically floats. Accordingly, in this case, the connection of the connector 400 with the connector 100 does not activate the safety mechanism of the board because the connection does provide a low-input that triggers the reset of the board 200. As such, the board 200 may properly interface with the device (not shown) connected to the board 200 via the connector 400 and the connector port 100.

In the case of FIG. 4B, the connector pin 420 contacts or connects to the pin 120 of connector. In this case, the connector pin 420 is connected to a ground or low reference potential. Therefore, the connection of the connector 400 with the connector 100 activates the safety mechanism of the board 200 because the connection provides a low-input to the reset of the board 200 which in turn activates the safety mechanism. As a result, the device of the connector 400 does not interface or operate with the board 200.

Figure 5:
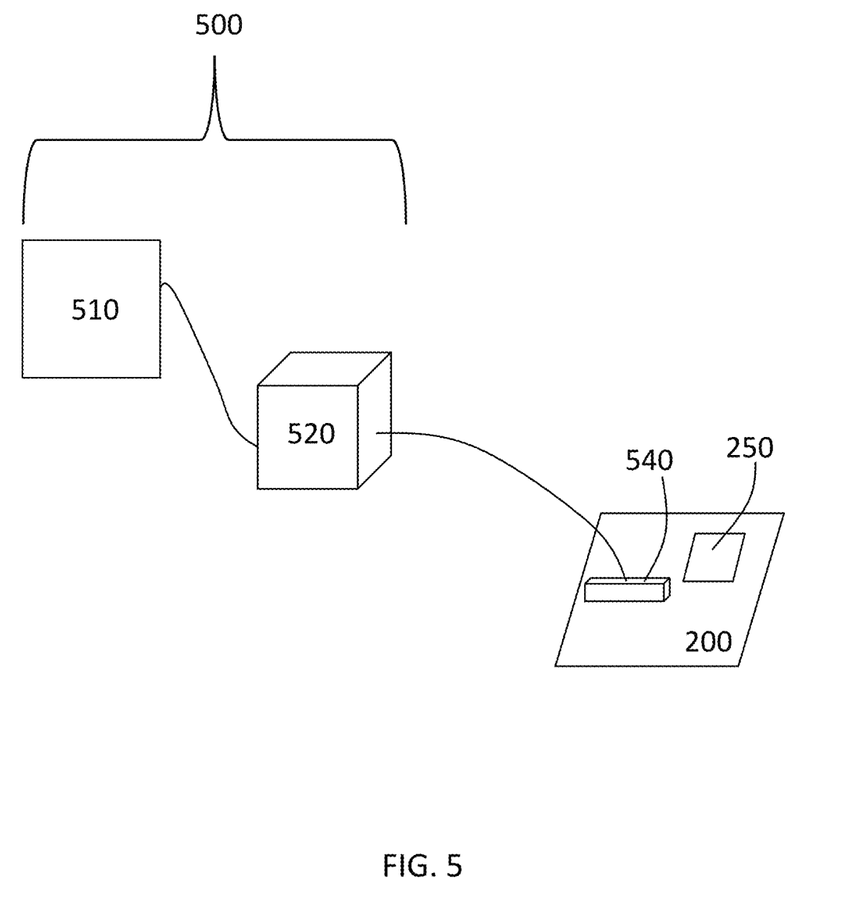
FIG. 5 show a diagram of a example tool connected to a board in accordance with one or more exemplary embodiments of the present disclosure.

FIG. 5 shows, a diagram depicting how the connectors described herein may be used. In FIG. 5, a tool 500 connects to the board 200 via the connector 540. The connector may connector to the connector portion or port 100 (not shown) of the board 200.

The tool includes a hardware component 520 and a software component 510 that may be implemented on a computing device. In other examples, the software component 510 and the hardware component may be integrated. The tool 500 may be debugger that is used to test and debug the board 200. For example, the board 200 may include a microcontroller 250. The tool may interface with board 200 and the microcontroller 250 for testing and debugging purposes. In accordance with embodiments described herein, the tool 500 may only work or be able to test or debug if the connector and the tool 500 are compatible, and if the connector 540 is properly connected to the connector port 100. Due to the configuration of the connector port 100 and the board 200, the board 200 may not need or include a multiplexer. Further, more of the pins of the connector can be safely accessible through the connector port 100.

Figure 6:
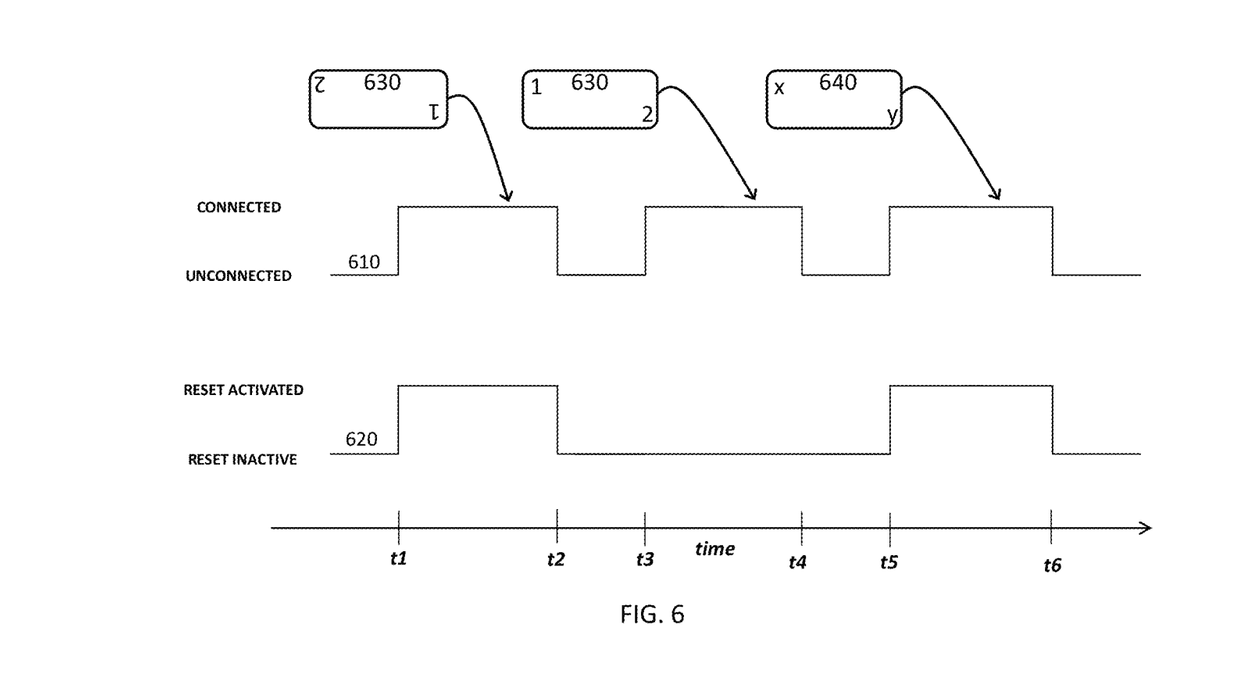
FIG. 6 show a timing diagram of a showing statuses of connection and reset for an example connector tool connected to an example board in accordance with one or more exemplary embodiments of the present disclosure.

FIG. 6 shows a simplified timing diagram illustrating timing at of connections of connector and connector port and associated reset states for a reset mechanism associated with the connector port according to exemplary embodiments described herein. The timing diagram may be simplified at least in the sense that propagation delays are ignored.

The line 610 can represents the connection status of a connector to a connector port. The connector port (not shown) can be, for example, the same or similar to the connector port 100, and further coupled to a circuit board (e.g., circuit board 200) that includes a reset mechanism, as described herein.

The line 610 shows connections or lack thereof between a connector port and connectors, and in particular connectors 630 and 640. In the example of FIG. 6, the connector 630 is a connector compatible with the connector port and the circuit board.

From time t1 to t2 the connector 630 is coupled or connected to the connector port with a wrong or incorrect orientation. This incorrect orientation is represented by the upside down characters "1" and "2" appearing in the connector 630. As a result of this incorrect connection, a reset or reset state is activated from t1 to t2 as shown in line 620. This reset causes at least the connector port and the board to be brought into a safety state during this period.

As shown in the line 610, from t2 to t3, there no connections to the connector port. Hence, line 620 shows the reset state as inactive during this time period. At time t3, the connection status changes corresponding to a connection between the connector port and the connector 630. In this instance, from t3 to t4, the connector 630 is connected to the connector port with a correct orientation. As a result, the line 620 shows the reset remaining inactive from t3 to t4.

From time t4 to t5, there is again no connection to the connector port and the reset continues to be inactive during this time period. From time t5 to t6, another connector, connector 640, connects to the connector port. In this example, the connector 640 is incompatible with the connector port and circuit board. Therefore, regardless of the orientation of the connector 640 when connected to the connector port, a reset is activated or active from time t5 to t6 as indicated by the signal 620.

The following examples pertain to further aspects of this disclosure:

Example 1 is a circuitry, including: one or more circuits; a connector portion coupled to the one or more circuits and comprising a plurality of pins, at least some of the pins having assigned functionality, wherein at least one first pin is to activate a mechanism to bring the one or more circuits into an electrically safe state; wherein, in case the connector portion is coupled with a first connector in a first orientation, the one or more circuits are configured to operate properly via the connector portion; and wherein, in case the connector portion is coupled with a second connector in a second orientation, the second orientation being different from the first orientation, the at least one first pin of the plurality of pins receives a reference potential that triggers activation of the mechanism so as to bring the one or more circuits into the electrically safe state.

Example 2 is the circuitry of Example 1, wherein the connector portion and the plurality of pins physically and mechanically may correspond to specifications of a standardized connector including a plurality of pins with respectively assigned potentials.

Example 3 is the circuitry of Example 2, wherein connection portion and the plurality pins may correspond mechanically and physically to a Universal Serial Bus type C connector.

Example 4 is the circuitry of Example 2 or 3, wherein the at least first pin of the plurality of pins may include a pin assigned to ground (GND) of the standardized connector.

Example 5 is the circuitry of any of Examples 1 to 4, wherein the connector portion may be rotationally symmetric.

Example 6 is the circuitry of Example 1, wherein the mechanism may be configured to bring the one or more circuits into the electrically safe state by bringing the one or more circuits to a high impedance pin state.

Example 7 is the circuitry of Examples 1 to 6, wherein the reference potential may be a ground potential.

Example 8 is the circuitry of any of Examples 1 to 7, wherein in case the connector portion is coupled with a connector of a tool in a first tool connector orientation, the one or more circuits may be configured to operate and interact with the tool.

Example 9 is the circuitry of any of Examples 1 to 8, wherein in case the connector portion is coupled with a connector incompatible with the connector portion, the at least one first pin of the plurality of pins may receive a reference potential that triggers activation of the mechanism so as to bring the one or more circuits into the electrically safe state.

Example 10 is the circuitry of any of Examples 1 to 9, wherein the circuitry may include a circuit board.

Example 11 is a method including: providing a connector portion coupled to one or more circuits and comprising a plurality of pins, at least some of the pins having assigned functionality; coupling a connector to the connector portion; obtaining, from the connector coupled to the connector portion, a reference potential in at least a first pin of the plurality of pins; activating, in response the obtaining the reference potential from coupled connector, a mechanism; and bringing, by the activated mechanism, the one or more circuits into an electrically safe state.

Example 12 is the method of Example 11, wherein the connector portion and the plurality of pins may correspond to specifications of a standardized connector.

Example 13 is the method of Example 12, wherein the standardized connector may correspond to a Universal Serial Bus C-type connector.

Example 14 is the method of Example 12 or 13, wherein the at least first pin of the plurality of pins may be assigned to a ground (GND) of the standardized connector.

Example 15 is the method of any of Examples 11 to 14, wherein the connector portion may be rotationally symmetric.

Example 16 is the circuitry of Example 11, wherein bringing the one or more circuits into the electrically safe state may include coupling the one or more circuits to a high impedance.

Example 17 is the circuitry of Example 11 or 12, wherein the reference potential may be a ground potential.

Example 18 is the method of any of Examples 11 to 17, wherein coupling the connector to the connector portion may include coupling a connector that is incompatible with the connector portion.

Example 19 is the method of any of Examples 11 to 17, wherein coupling the connector to the connector portion may include coupling the connector in an incorrect orientation with the connector portion.

While the description refers to specific embodiments, it should be understood by those skilled in the art that various changes in form and detail may be made therein without departing from the spirit and scope as defined by the appended claims. The scope is thus indicated by the appended claims and all changes which come within the meaning and range of equivalency of the claims are therefore intended to be embraced.

What is claimed is:

1. A circuitry, comprising:
    one or more circuits;
    a connector portion coupled to the one or more circuits and comprising a plurality of pins, at least some of the pins having assigned functionality, wherein at least one first pin is to activate a mechanism to bring the one or more circuits into an electrically safe state;
    wherein, when the connector portion is coupled with a first connector in a first orientation, the one or more circuits are configured to operate properly via the connector portion; and
    wherein, when the connector portion is coupled with a second connector in a second orientation, the second orientation being different from the first orientation, the at least one first pin of the plurality of pins receives a reference potential that triggers activation of the mechanism so as to bring the one or more circuits into the electrically safe state.

2. The circuitry of claim 1,
    wherein the connector portion and the plurality of pins physically and mechanically corresponds to specifications of a standardized connector including a plurality of pins with respectively assigned potentials.

3. The circuitry of claim 2,
    wherein the connector portion and the plurality of pins corresponds mechanically and physically to a Universal Serial Bus type C connector.

4. The circuitry of claim 2,
    wherein the at least a first pin of the plurality of pins comprises a pin assigned to ground (GND) of the standardized connector.

5. The circuitry of claim 1, wherein the connector portion is rotationally symmetric.

6. The circuitry of claim 1,
    wherein the mechanism is configured to bring the one or more circuits into the electrically safe state by bringing the one or more circuits to a high impedance pin state.

7. The circuitry of claim 1, wherein the reference potential is a ground potential.

8. The circuitry of claim 1,
    wherein in case the connector portion is coupled with a connector of a tool in a first tool connector orientation, the one or more circuits are configured to operate and interact with the tool.

9. The circuitry of claim 1,
    wherein in case the connector portion is coupled with a connector incompatible with the connector portion, the at least one first pin of the plurality of pins receives a reference potential that triggers activation of the mechanism so as to bring the one or more circuits into the electrically safe state.

10. The circuitry of claim 1, wherein the circuitry comprises a circuit board.

11. A method comprising:
    providing a connector portion coupled to one or more circuits and comprising a plurality of pins, at least some of the pins having assigned functionality;
    coupling a connector to the connector portion, wherein the one or more circuits are configured to operate properly via the connector portion when the connector portion is coupled to the connector in a first orientation;
    obtaining, from the connector coupled to the connector portion, a reference potential in at least a first pin of the plurality of pins when the connector portion is coupled to the connector in a second orientation, wherein the second orientation different from the first orientation;
    activating, in response the obtaining the reference potential from coupled connector, a mechanism; and
    bringing, by the activated mechanism, the one or more circuits into an electrically safe state.

12. The method of claim 11, wherein the connector portion and the plurality of pins corresponds to specifications of a standardized connector.

13. The method of claim 12, wherein the standardized connector corresponds to a Universal Serial Bus C-type connector.

14. The method of claim 12,
    wherein the at least a first pin of the plurality of pins is assigned to a ground (GND) of the standardized connector.

15. The method of claim 11, wherein the connector portion is rotationally symmetric.

16. The method of claim 11, wherein bringing the one or more circuits into the electrically safe state comprises coupling the one or more circuits to a high impedance.

17. The method of claim 11, wherein the reference potential is a ground potential.

18. The method of claim 11, wherein coupling the connector to the connector portion comprises coupling a connector that is incompatible with the connector portion.

19. The method of claim 11, wherein coupling the connector to the connector portion comprises coupling the connector in an incorrect orientation with the connector portion.

20. An electrical connector, comprising:
a plurality of pins arranged symmetrically, wherein a first pin of the plurality of pins is configured to carry a reference signal, a second pin of the plurality of pins is configured to carry a signal different from the reference signal, and wherein the second pin is mirrored across a symmetric axis from the first pin; and
a mechanical interface that connects the plurality of pins to a circuit, wherein the mechanical interface can connect the plurality of pins to the circuit in a first orientation and a second orientation, wherein the first orientation and the second orientation are different;
wherein when the electrical connector is coupled to the circuit through the mechanical interface in the first orientation, the circuit is configured to operate properly based on the signal from the second pin;
wherein when the electrical connector is coupled to the circuit through the mechanical interface in the second orientation, the circuit is configured to enter an electrically safe state based on the reference signal from the first pin.

* * * * *